United States Patent
Konishi

(10) Patent No.: US 8,654,213 B2
(45) Date of Patent: Feb. 18, 2014

(54) IMAGING DEVICE

(75) Inventor: Tetsuya Konishi, Machida (JP)

(73) Assignee: Nikon Corporation, Tokyo (JP)

( * ) Notice: Subject to any disclaimer, the term of this patent is extended or adjusted under 35 U.S.C. 154(b) by 431 days.

(21) Appl. No.: 12/585,889

(22) Filed: Sep. 28, 2009

(65) Prior Publication Data

US 2010/0085444 A1    Apr. 8, 2010

(30) Foreign Application Priority Data

Oct. 8, 2008 (JP) ................................ 2008-261491

(51) Int. Cl.
*H04N 5/76* (2006.01)
*H04N 5/222* (2006.01)

(52) U.S. Cl.
USPC ............... 348/231.9; 348/231.2; 348/333.01; 348/333.05

(58) Field of Classification Search
USPC ........ 348/208.1, 208.14, 220.1, 231.1, 231.2, 348/231.3, 231.9, 333.01, 333.02, 333.04, 348/333.05
See application file for complete search history.

(56) References Cited

U.S. PATENT DOCUMENTS

| | | | |
|---|---|---|---|
| 6,937,651 B1 * | 8/2005 | Brill et al. | 375/240 |
| 7,522,194 B2 * | 4/2009 | Higuchi et al. | 348/231.2 |
| 7,777,780 B2 * | 8/2010 | Oya et al. | 348/208.1 |
| 7,817,193 B2 * | 10/2010 | Ikeyama et al. | 348/231.99 |
| 7,956,904 B2 * | 6/2011 | Sakaue et al. | 348/231.2 |
| 2002/0126221 A1 | 9/2002 | Link | |
| 2005/0001908 A1 * | 1/2005 | Lee | 348/231.2 |
| 2008/0129854 A1 | 6/2008 | Onoda et al. | |
| 2010/0085444 A1 * | 4/2010 | Konishi | 348/231.99 |
| 2010/0171846 A1 * | 7/2010 | Wood et al. | 348/231.99 |

FOREIGN PATENT DOCUMENTS

| | | |
|---|---|---|
| JP | A-2003-219267 | 7/2003 |
| JP | A-2003-283966 | 10/2003 |
| JP | A-2005-328404 | 11/2005 |
| JP | A-2006-140892 | 6/2006 |
| JP | A-2007-258862 | 10/2007 |
| JP | A-2008-147966 | 6/2008 |

OTHER PUBLICATIONS

European Search Report issued in European Application No. 09012707.7 dated Sep. 29, 2011.
Nov. 20, 2012 Office Action issued in JP Application No. 2008-261491 (with English translation).
Jul. 2, 2013 Office Action issued in Japanese Patent Application No. 2008-261491 (with translation).

* cited by examiner

*Primary Examiner* — Lin Ye
*Assistant Examiner* — Peter Chon
(74) *Attorney, Agent, or Firm* — Oliff, PLC

(57) ABSTRACT

An imaging device comprising an image pickup sensor that captures an image of a subject, a storage unit that temporarily stores a plurality of frames of image data captured by the image pickup sensor, a detection unit that detects identity or non-identity between at least two image data consecutively captured by the image pickup sensor adjacent in time based on a predetermined image characteristic quantity, and a control unit that controls the device to write the later captured image data in the storage unit when the detection unit detects the non-identity and to not write the later captured image data in the storage unit when it detects the identity.

5 Claims, 4 Drawing Sheets

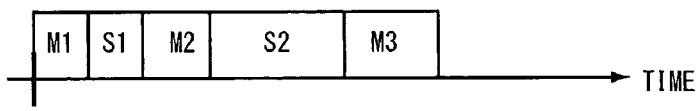
Fig. 6A BUFFER CAPACITY

Fig. 6C PRESENT EMBODIMENT 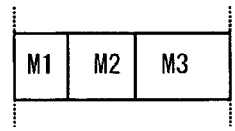

IMAGING DEVICE

CROSS-REFERENCE TO RELATED APPLICATION

The disclosure by the following priority application is herein incorporated by reference: Japanese Patent Application No. 2008-261491 filed on Oct. 8, 2008.

TECHNICAL FIELD

The present invention relates to a digital camera or other imaging device comprising an image pickup sensor capturing an image of a subject through an optical unit.

BACKGROUND ART

Technology is being developed which utilizes a continuous shooting function of a digital camera to consecutively shoot a plurality of images, stores them temporarily in a buffer memory, displays them slow sequentially at a display unit at time intervals longer than the shooting intervals in the continuous shooting, and enables a photographer to instruct storage during the slow display so as to store image data of an image displayed at the time of instruction of storage in an image storage medium etc. (for example, see Japanese Patent Laid-open Publication (A) No 2006-140892).

When shooting while viewing a live view image displayed on a display unit in real time, if the subject is moving fast etc., it is not necessarily easy to capture the best shot. By instructing storage while viewing the images of a subject displayed slow in this way, however, it becomes possible to more accurately capture the best shot. In the present specification, the function will be called a "slow display, shooting function" and shooting utilizing this function will be called "slow display shooting".

In this regard, the capacity of the buffer memory used for temporary storage of images is restricted due to costs and other factors, so it is not possible to slow display more than the number of images defined in relation to this limited capacity of the buffer memory. Further, the subject being shot may be variously in motion or stationary. In the past, all images were written in the buffer memory without distinguishing between them.

SUMMARY OF INVENTION

Technical Problem

However, when the subject is stationary, substantially the same image is merely written several times. From the viewpoint of capturing the best shot, a single such image is sufficient. Therefore, in the past, the limited buffer memory was wastefully used up. The possibility of missing the best shot became higher by that amount.

The present invention was made in consideration of this point and has as its object the provision of an imaging device able to improve the efficiency of utilization of the buffer memory and reduce the frequency of best shots missed at the time of slow display shooting.

Solution to Problem

The imaging device according to the present invention comprises an image pickup sensor that captures an image of a subject, a storage unit that temporarily stores a plurality of frames of image data captured by the image pickup sensor, a detection unit that detects identity or non-identity between at least two image data consecutively captured by the image pickup sensor adjacent in time based on a predetermined image characteristic quantity, and a control unit that controls the device to write the later captured image data in the storage unit when the detection unit detects the non-identity and to not write the later captured image data in the storage unit when it detects the identity.

Advantageous Effects of Invention

The imaging device according to the present invention is designed to detect identity or non-identity among at least two images consecutively captured by the image pick up sensor adjacent in time based on a predetermined image characteristic quantity, write an image detected with the non-identity in the storage unit, and not write an image detected with the identity in the storage unit, so it is possible to use the storage area corresponding to the images detected to have the identity and not written in the storage unit for storage of images detected to have the non-identity.

Therefore, it is possible to prevent wasteful use of the storage area of the storage unit where substantially the same image is written several times when the subject is stationary etc., the efficiency of utilization of the buffer memory is improved, and a greater number of substantially different images can be obtained, so there is the advantageous effect that it is possible to reduce the frequency of best shots missed.

BRIEF DESCRIPTION OF DRAWINGS

FIG. 6A is a view schematically showing a buffer capacity.

FIG. 6C is a view showing a storage capacity of a buffer of an embodiment of the present invention.

DESCRIPTION OF EMBODIMENTS

Below, a digital camera according to an embodiment of the present invention will be explained with reference to the drawings. Note that, the imaging device to which the present invention can be applied includes compact digital cameras, single lens reflex type digital cameras, digital video cameras, and all other cameras able to capture at least still images by a digital format. Further, it is not limited to devices named "cameras" and also includes mobile phones, PDAs, and other electronic devices provided with image capturing functions.

Overall Configuration of Camera

Figure 1:
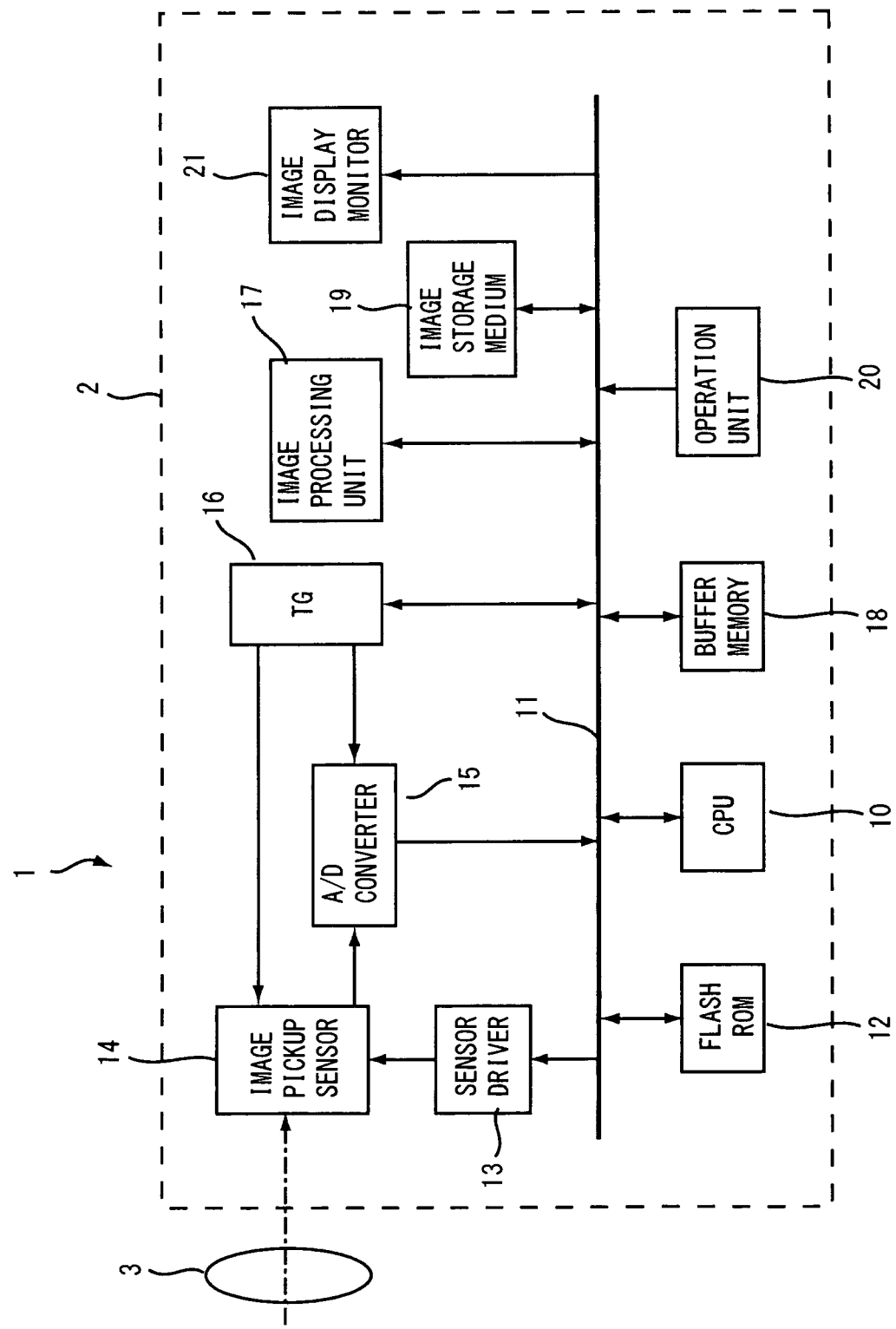
FIG. 1 is a block diagram showing the schematic configuration of a digital camera in an embodiment of the present invention.

FIG. 1 is a block diagram showing the overall configuration of a digital camera in an embodiment of the present invention. As shown in FIG. 1, this camera 1 is provided with a camera body 2 and a photographic lens 3 as an optical unit. Here, the photographic lens 3 may be fixed to the camera body 2 or may be interchangeable.

The camera body 2 is provided with a CPU 10. The CPU 10 is connected to a system bus 11. The CPU 10 receives input of signals output from the later explained blocks, performs predetermined processing based on control programs (including the later explained slow display shooting processing program), various types of control data, etc. stored in a flash ROM 12 connected to the system bus 11, and outputs control signals based on the processing results to the blocks.

The system bus 11 is connected through a sensor driver 13 to an image pickup sensor 14. Further, the system bus 11 is connected to an A/D converter 15, timing generator (TG) 16, image processing unit 17, buffer memory 18, image storage medium 19, and operation unit 20. Furthermore, the system bus 11 is connected through a display drive unit (not shown) to an image display monitor (liquid crystal panel) 21.

The image pickup sensor 14 is comprised of a CCD, CMOS, etc. It receives and captures light from a subject through the photographic lens 3 and outputs an imaging signal (analog signal as stored charge). The imaging signal output from the image pickup sensor 14 is converted at the A/D converter 15 to a digital signal which is sent through the system bus 11 to the image processing unit 17. Note that, the timing generator 16 outputs a timing signal driving the image pickup sensor 14 and a timing signal driving the A/D converter 15.

The image processing unit 17 is comprised of an ASIC (Application Specific Integrated Circuit) etc. and processes the digital signal, that is, the raw image data, for adjustment of the white balance (WB), contour compensation, gamma correction, and other image processing and performs compression processing for compressing data by a predetermined compression scheme (for example, JPEG etc.) or processing for decompressing the compressed image data.

The buffer memory 18 is a memory temporarily storing raw image data, image data after image processing, and other data as a work area for processing by the CPU 10. Part of this buffer memory 18 is also used for temporarily storing a plurality of continuously shot image data in the later explained slow display shooting mode.

The image storage medium 19 is a memory card etc. having portability comprised of a flash memory etc. and stores compressed image data (still images and moving images) together with predetermined additional information. The image storage medium 19 can be mounted interchangeably in a predetermined slot (not shown) provided at the camera body 2.

The operation unit 20 includes a release button enabling two switching modes by half depression and full depression, a main switch for turning the main power on/off, a command dial, menu button, item selection use cross keys, OK button (execute button), shooting mode selection button for selecting the slow display shooting mode or other shooting mode, etc. A photographer operates these switches, buttons, etc. by a predetermined procedure so as to instruct shooting and also select the various types of modes etc., change settings, and perform other instructions accompanying shooting.

Images sent from the image processing unit 17, images read out from the buffer memory 18 or image storage medium 19, information relating to shooting, etc. are displayed through a not shown display drive unit on an image display monitor 21.

The image display monitor 21 is provided at the back surface of the camera body 2. In a live view display mode, an image being captured by the image pickup sensor 14 is displayed as a through image on the image display monitor 21 in real time. Note that, a "through image" means an image obtained by performing predetermined processing to thin a raw image based on the relationship of the resolution of the image pickup sensor 14, the resolution of the image display monitor 21, etc. and displayed by a frame rate enabling visual recognition as a moving image.

Slow Display Shooting Function

Figure 2:
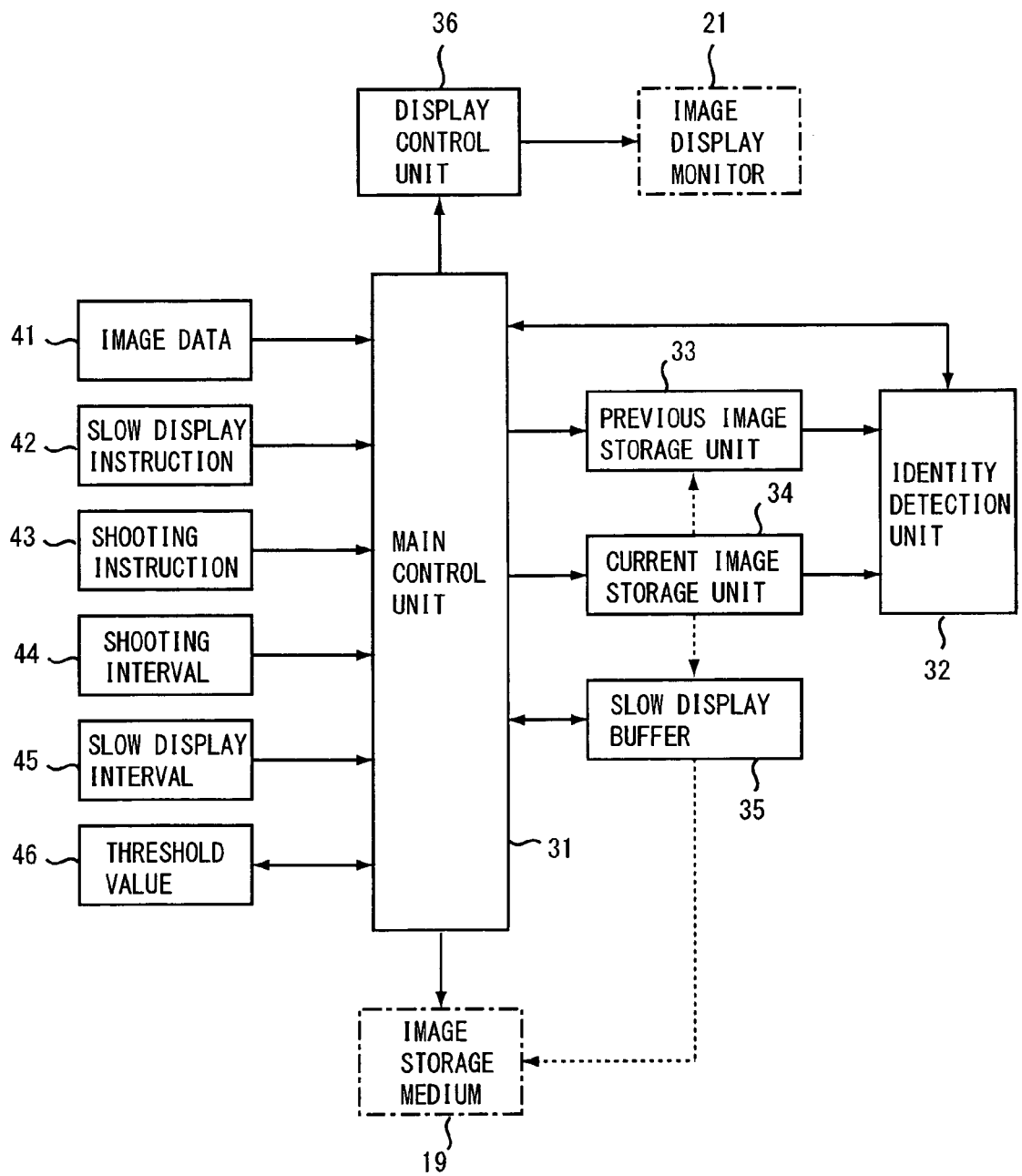
FIG. 2 is a block diagram showing the configuration of a slow display shooting function of a digital camera in an embodiment of the present invention.

FIG. 2 is a block diagram showing the functional configuration for realizing a slow display shooting function in an embodiment of the present invention. This function is realized by the CPU 10 running a predetermined slow display shooting processing program stored in advance in the flash ROM 12. Note that, in this embodiment, this function is explained as being realized by software, but part or all of the function may also be realized by hardware by an electronic circuit.

This program is briefly comprised of a main control unit (control means) 31 as a central unit, an identity detection unit (detection means) 32, previous image storage unit 33, current image storage unit 34, slow display buffer (storage means) 35, and display control unit 36.

Here, as the previous image storage unit 33 and current image storage unit 34, part of a predetermined work area set in advance in the above-mentioned buffer memory 18 is used. As the slow display buffer 35, a predetermined slow display buffer area set in advance in the buffer memory 18 other than the work area is used. The previous image storage unit 33 and current image storage unit 34 have storage capacities equivalent to one image each, while the slow display buffer 35 has a storage capacity corresponding to for example 100 images.

The capacity of the slow display buffer 35 may also be made changeable in steps or continuously in relation to the storage capacity of the buffer memory 18 and the storage capacity of the work area etc. by a predetermined setting operation by the photographer using the operation unit 20.

Note that, here, the slow display buffer 35 is comprised as an FIFO (first-in first-out) type of ring buffer. That is, image data is written in accordance with a write pointer successively incremented from a head address of the slow display buffer 35. If written to the final address of the slow display buffer 35, the head address is returned to and the new image data is successively written in a manner overwriting the already written data. On the other hand, image data is read in accordance with a read pointer successively incremented from the head address of the slow display buffer 35. If read from the final address of the slow display buffer 35, the head address is returned to and further image data is read out.

The main control unit 31 successively reads out the image data written in the slow display buffer 35 and, through a display control unit 36, displays a reproduced image of the image data on the image display monitor 21. Note that, the display control unit 36 processes the image data of the slow display buffer 35 to convert it (thin it) to an image suitable for display on the image display monitor 21.

The main control unit 31 receives as input image data 41 of an image captured by the image pickup sensor 14 and subjected to predetermined image processing by the image processing unit 17 and a slow display instruction 42 in accordance with operation of a slow display instruction button and a shooting instruction 43 in accordance with operation of a shooting instruction button of the operation unit 20. Note that, in this embodiment, the slow display instruction 42 is designed to be generated by half depressing the release button and to stop by release of the half depression. On the other hand, the shooting instruction is generated by full depression of the release button. That is, in the present embodiment, the slow display instruction button and the shooting instruction button are provided by the single release button.

Further, the main control unit 31 receives as input the preset shooting interval 44, slow display interval 45, and a threshold value 46 used for detection of identity of image data. The shooting interval 44 is the time interval for continuous shooting in the slow display shooting mode, that is, the time from shooting one image to shooting the next image. The shooting interval 44, for example, when continuously shooting 50 frames per second, is set to 0.02 second.

The slow display interval 45 means the time interval when slow displaying images on the image display monitor 21, that is, the time from when displaying one image to when displaying the next image. The slow display interval 45 is set to a time longer than the shooting interval 44. For example, if slow displaying images by a speed made several times longer than the shooting interval 44, for example, made 2 times longer, it would mean the display of 25 images per second and the interval would be set to 0.04 second. Note that, these shooting interval 44 and slow display interval 45 may also be preset fixed values, but preferably it is made possible to change the settings in steps or continuously by a predetermined setting operation by the photographer using the operation unit 20.

The threshold value 46 is a value used when judging identity of two adjacent images by the later explained identity detection unit 32 and prescribes the range of that identity. The images shot adjacent in time will almost never completely match in for example a comparison in pixel units, so even if not completely identical, images of an extent which can be deemed identical should be judged as identical. The threshold value 46 prescribes this range. The threshold value 46 used is a suitable value obtained according to a later explained algorithm for detection of identity.

The identity detection unit 32 is a detecting means for detecting identity or non-identity based on an image characteristic quantity relating to at least one (that is, one, any two, or all) of movement of the main subject in an image for at least two image data, changes in color of at least part (that is, all or part) of the image, and changes in brightness for at least part (that is, all or part) of the image. Here, the image characteristic quantity is calculated for two adjacent images to judge identity.

The identity detection unit 32 calculates the image characteristic quantity based on the image temporarily stored in the previous image storage unit 33 (previous image) and image temporarily stored in the current image storage unit (current image) and compares the image characteristic quantity with the threshold value 46 to detect identity or non-identity of these images. As the algorithm used for detection of identity by the identity detection unit 32, various types may be used.

As the algorithm used for detection of identity (first algorithm), for example, one which uses as the image characteristic quantity a cumulative value of differences of luminance values (brightness) or color characteristic values (colors) for the total areas of a previous image and current image or parts of the same to be noted as the main subject (specific areas), compares this with the threshold value 46, determines that there is identity when the cumulative value is less than the threshold value 46, and determines that there is non-identity when the cumulative value is the threshold value 46 or more may be illustrated.

When the color system of the image is RGB, this first algorithm calculates the cumulative value of the differences for the pixels in the entire areas or the pixels in specific areas for at least one of the R value, G value, and B value and compares this with the threshold value 46. It is also possible to calculate the cumulative values of the differences for any two or all of the R value, G value, and B value and compare a cumulative value obtained by further adding these with the threshold value 46.

Further, it is also possible to calculate the cumulative values of differences for any two or all of the R value, G value, and B value, compare each of these with the threshold value 46, determine that there is non-identity when at least one of the cumulative values is the threshold value 46 or more, and determine that there is identity in other cases. In this case, as the threshold value 46, it is also possible to set a threshold value different for each of the R value, G value, and B value. When the color system of the image is YUV (YCbCr), the Y value serving as the luminance value and the Cb value and Cr value serving as the color characteristic value are processed in the same way.

As another example of the algorithm used for detection of identity (second algorithm), the example of using as the image characteristic quantity a cumulative value of differences of luminance values or color characteristic values for all or specific areas of images obtained by differentially filtering or otherwise processing a previous image and current image, comparing this with the threshold value 46, determining that there is identify when the cumulative value is less than the threshold value 46, and determining that there is no identity when the cumulative value is the threshold value 46 or more may be illustrated.

When calculating the image characteristic quantity based on specific areas of the previous image and current image, for the specific areas, it is preferable to set several locations in the shooting field in advance and enable at least one of these to be selected by a predetermined selection operation by the photographer using the operation unit 20. In this case, the specific area of the previous image and the specific area of the current image are made the same positions and same sizes.

As still another example of the algorithm used for detection of identity (third algorithm), the example of calculating as the image characteristic quantity the movement of the main subject in the previous image and current image (amount of movement), comparing the amount of movement with the threshold value 46, determining that there is identity when the amount of movement is less than the threshold value 46, and determining that there is no identity when the amount of movement is the threshold value 46 or more may be illustrated.

As the technique for detecting movement of the main subject, subject tracking or other known art may be used. For example, the previous image and the current image are processed by template matching using a template image and the amount of movement of the area matched with the template image is calculated for use as the image characteristic quantity.

Here, the "template image" is image data serving as the reference in template matching processing. One or more template images recorded in advance by performing a predetermined registration operation in advance are used. As the template image, any image may be recorded, but for example it is possible to use the face of a person etc. as the template image. However, the template image is not limited to preregistered ones. For example, it is also possible to use known facial recognition and other art for identifying the face of a person in an image and dynamically set an image without a registration operation.

When performing template matching processing, the identity detection unit 32 examines each of the previous image and the current image to detect if there is a matching area matching the template image in the image (target image) and, if there is, detects that position and uses the difference of positions as the amount of movement. Note that, as the template matching processing, for example, it is possible to use cross-correlation, sequential similarity detection, or other known technique.

Template matching processing, specifically, sets a rectangular frame for matching with the template image in the target image as a target area, moves the position of the target area within the target image a predetermined amount at a time, for example, one pixel at a time, and calculates the degree of similarity of the image in the target area at each position and the template image. Further, it performs the template matching processing for the target image as a whole and uses the position of the area with the highest degree of similarity with the template image in the target areas (matching area) as the matching result. The identity detection unit 32 uses the difference between the matching image for the previous image and the matching area for the current image as the amount of movement (image characteristic quantity) for comparison with the threshold value 46 and judgment of identity.

Note that, the detection of movement of the main subject is not limited to such template matching processing. For example, it is also possible to perform this using the processing for detection of motion of the subject as described in Japanese Patent Laid-open Publication (A) No. 2000-59699.

The above-mentioned algorithms are just illustrations. It is also possible to use an algorithm different from these to detect identity. It is also possible to prepare a plurality of algorithms used for detection of identity and have the photographer use the operation unit 20 to perform a predetermined setting operation to enable him to select one of these. Further, rather than using one of the above-mentioned algorithms, it is also possible to perform a plurality of them and judge identity based on the overall results.

Note that, in the above-mentioned explanation, the threshold value 46 used as a preset value, but it is also possible to change it in steps or continuously by a predetermined setting operation by the photographer at the operation unit 20. Further, the threshold value 46 may be dynamically automatically changed based on a value obtained by statistically processing past detection results. As one example, it is possible to hold a certain amount of past history of detection results (identity or non-identity) and change the threshold value 46 to a smaller value when detection results of existence of identity continue over a long period of time and change the threshold value 46 to a larger value when detection results of non-identity continue over a long period of time. Further, it is also possible to change the threshold value 46 to a larger value or a smaller value in accordance with the frequency by which the detection results invert (from identity to non-identity and from non-identity to identity) per predetermined time.

Further, when the detection results by the identity detection unit 32 frequently invert in a short time (for example, when changing every image or every several images), it is considered that the subject will seldom be moving and stopping so frequently and it can be guessed that this is due to shaking of the hand or outside disturbance, so in this case, it may be judged that the subject is stationary and, regardless of the detection results, it be assumed that there continue to be identity or continue to be non-identity for a certain period of time.

Further, when calculating the image characteristic quantity based on specific areas of the previous image and current image, the specific areas need not be set in advance by the photographer by a selection operation as explained above. It is also possible to dynamically select them by applying the above-mentioned subject tracking (template matching processing or movement detection processing) or other known art. For example, when using the above-mentioned template matching processing, the matching area for the previous image is made the specific area and the matching area for the current image is made the matching area.

If dynamically selecting the specific areas in this way, sometimes the specific area of the previous image and the specific area of the current image will become mutually different positions and identity will be judged based on the specific areas of these different positions. Due to this, when the main subjects are present at different positions in the images, but identity is recognized in the main subjects, it is possible to determine that there is identity as a whole. Such a technique can sometimes be convenient when there is no motion in the main subject itself, but the posture of the camera changes or depending on the shot scene.

In this regard, when the camera is provided with an image stabilization mechanism, it is preferable to use the image after operation of the image stabilization mechanism so as to determine any identity. As the image stabilization mechanism, either of an optical type which detects vibration occurring in the camera by a vibration detection sensor and causes vibration of the lens 2 or image pickup sensor 14 to cancel out that vibration or an electronic type which compares the captured image and a subsequent captured image, calculates the amount of offset, and automatically shifts the photographable area to correct this may be used.

Processing in Slow Display Shooting Mode

Figure 3:
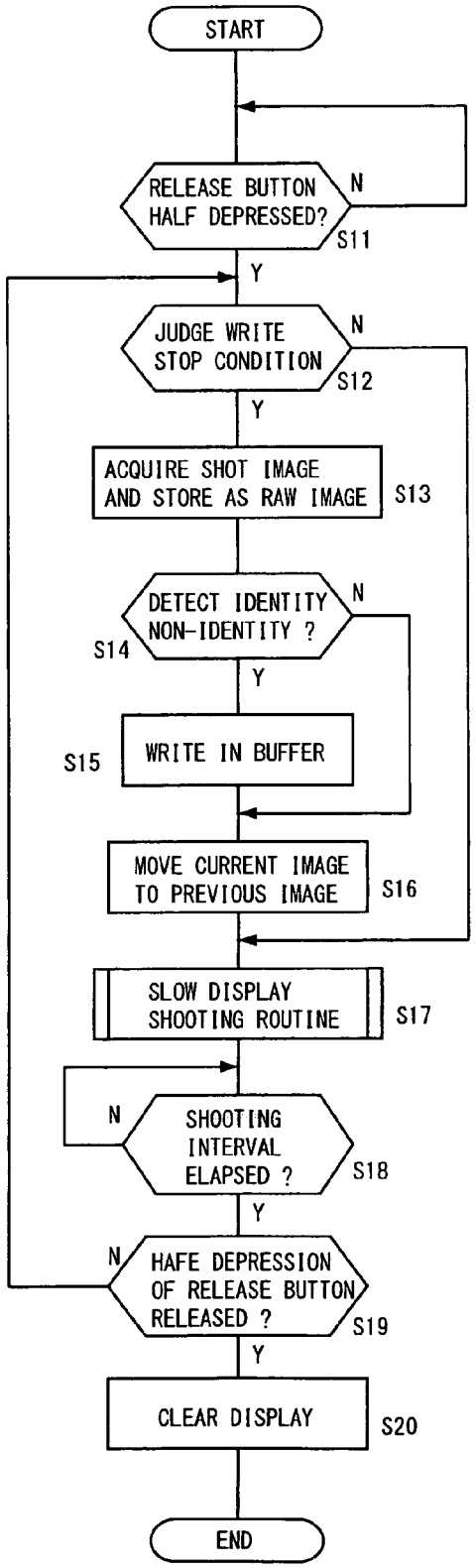
FIG. 3 is a flow chart showing a main routine of a slow display shooting processing in an embodiment of the present invention.
Figure 4:
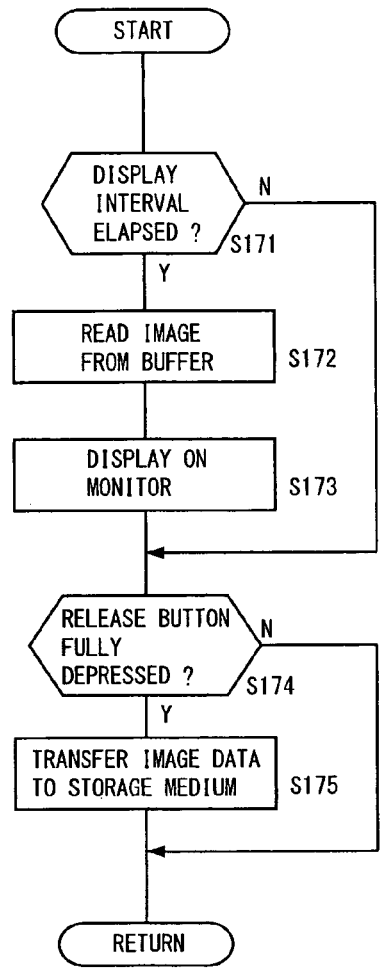
FIG. 4 is a flow chart showing a sub routine of a slow display shooting processing in an embodiment of the present invention.

FIG. 3 is a flow chart showing processing in the slow display shooting mode of an embodiment of the present invention, while FIG. 4 is a flow chart showing details of the slow display shooting routine of FIG. 3 (step S17). This slow display shooting mode, as one example, is started by the photographer operating a mode selection button of the operation unit 20 to select this slow display shooting mode.

In FIG. 3, when the processing is started, first, the main control unit 31 judges if the release button has been half depressed (step S11). When judging that it has not been half depressed (case of N), the unit stands by, while when it judges that it has been half depressed (case of Y), it judges predetermined stop conditions relating to whether to continue writing image data in the slow display buffer 35 or stop (step S12). At this step S12, it judges Y when continuing writing and judges N when stopping the writing.

As a stop condition (first stop condition), for example, it judges to stop writing (N) if a write pointer of the slow display buffer 35 has reached the final address and judges to continue writing (Y) if not reaching the final address. By using this judgment, the write operation is stopped when writing images to the final address of the slow display buffer 35.

Further, as another stop condition (second stop condition), it is possible to judge to stop writing (N) if the write pointer of the slow display buffer 35 reaches the final address, then return to the start address and proceed again and, in some cases, repeat this, then catch up with the read pointer and judge to continue writing (Y) if not catching up with it. By using this judgment, image data for which slow display has been finished is overwritten and writing is stopped when image data for which slow display has not been finished would be overwritten.

Furthermore, it is also possible not to judge the stop condition at step S12. That is, it is also possible not to stop writing and to further overwrite images even when the write pointer of the slow display buffer 35 reaches the final address, then return to the start address and proceed again and, in some cases, repeat this, then catch up with the read pointer.

Note that, at step S12, whether to judge the first stop condition, judge the second stop condition, or not judge the stop condition may also be made selectable by the photographer performing a setting operation at the operation unit 20.

When judging at step S12 to stop writing (case of N), the routine proceeds to step S17. When judging at step S12 to continue writing (case of Y), next, the routine acquires the image data 41 and temporarily stores the acquired image data 41 in the current image storage unit 34 as the current image (step S13).

Next, the identity detection unit 32 detects identity or non-identity between the previous image stored in the previous image storage unit 33 and the current image stored in the current image storage unit 34 (step S14) and notifies the detection result to the main control unit 31. Note that, when the image data 41 acquired at step S13 was one first acquired after the start of processing, the previous image storage unit 33 does not store any image data as the previous image, so the identity detection unit 32 determines non-identity, that is, there is no identity, and notifies this to the main control unit 31.

At step S14, when the identity detection unit 32 detects non-identity, that is, there is no identity, and this is notified to the main control unit 31, the routine writes the image data stored in the current image storage unit 34 at the address corresponding to the current write pointer of the slow display buffer 35 (step S15), then proceeds to step S16. Note that, after this write operation, the write pointer is incremented. At step S14, when the unit detects identity (case of N), the routine proceeds to step S16 without writing the image data stored in the current image storage unit 34 to the slow display buffer 35.

At step S16, the routine moves the image data of the raw image stored in the current image storage unit 34 to the previous image storage unit 33 as a previous image, the proceeds to the later explained slow display shooting routine (step S17). After the slow display shooting routine of step S17 ends, the main control unit 31 judges if a time corresponding to the shooting interval 44 has elapsed from when obtaining the image data the previous time at step S13.

When judging at step S18 that a time corresponding to the shooting interval 44 has not elapsed (case of N), the routine waits until it elapses. When judging that it has elapsed (case of Y), the routine judges if the half depressed state of the release button has been released (step S19). When it judges at step S19 that the half depressed state of the release button has been released (case of Y), it clears the image currently being displayed on the image display monitor 21 through the display control unit 36 (step S20) and ends this processing. When judging at step S19 that the half depressed state of the release button continues, that is, has not been released (case of N), the routine returns to step S12 and repeats from step S12 to step S19 for acquiring the next image data etc.

Next, details of the slow display shooting routine of S17 will be explained with reference to FIG. 4. When the slow display shooting routine is started, the main control unit 31 first judges if a time corresponding to the slow display interval 45 has elapsed from the previous display (the later explained step S173) (step S171). Note that when display the first image, it judges that a time corresponding to the slow display interval 45 has elapsed.

When judging at step S171 that a time corresponding to the slow display interval 45 has elapsed (case of Y), the routine reads the image data from the address corresponding to the read pointer of the slow display buffer 35 (step S172) and increments the read pointer. Next, it displays the image relating to that image data on the image display monitor 21 through the display control unit 36 (step S173) and proceeds to step S174. Note that, the display of this image due to step S173 is continued until the next time this step S173 is executed or until the display is cleared by step S20 of FIG. 3.

When judging at step S171 that a time corresponding to the slow display interval 45 has not elapsed (case of N), the routine skips steps S172 and S173 and proceeds to step S174. Next, at step S174, it judges if the release button has been fully depressed. When judging that it has been fully depressed (case of Y), the image data of the image being displayed at the image display monitor 21 at this time, that is, the image data corresponding to one position of the read pointer before the current one of the slow display buffer 35 is transferred to the image storage medium 19 (step S175) and the routine returns to step S18 of FIG. 3. When it is judged at step S174 that the release button has not been fully depressed (case of N), the routine skips step S175 and returns to step S18 of FIG. 3.

The above-mentioned series of processing may be simply summarized as follows from the viewpoint of the photographer. If the photographer sets the device to the slow display shooting mode, then half depresses the release button, images continuously shot according to the shooting interval 44 are stored in the slow display buffer 35.

Further, by half depression of this release button, display of the images stored (or being stored) in the slow display buffer 35 at the image display monitor 21 is started. The display at this time is performed slowly in accordance with the slow display intervals 45, so the photographer can view the images being slow displayed and depress in full the release button at the optimum timing so as to transfer and record the image data of the image being displayed as image data to be recorded and stored to the image storage medium 19.

Note that, when, at step S12, stopping the writing of image data to the slow display buffer 35 due to the above-mentioned first or second stop condition, so long as the half depressed state of the release button is not released at step S19, the slow display is successively continued for the not yet displayed images. When slow display of all images ends, the series of images is again slow displayed from the current position of the read pointer. Further, when not judging a stop condition at step S12, so long as the half depressed state of the release button is not released at step S19, the slow display is successively continued for the not yet displayed images. When the write pointer overtakes the read pointer, the overwritten new images are successively slow displayed. In this case, the not yet displayed image is discarded before being overwritten.

Note that, the above-mentioned embodiment calculated the image characteristic quantity for two adjacent images (previous image and current image) so as to judge identity, but when judging identity of the current image, if there are two or more images consecutively captured before said current image, it is also possible to judge for identity of the current image based on these two or more images.

Further, in the present embodiment, for detection of identity by the identity detection unit 32, the previous image storage unit 33 and the current image storage unit 34 are provided, but it is also possible to omit the previous image storage unit 33, provide only the current image storage unit 34, and compare the image of the current image storage unit 34 and the last stored image of the slow display buffer 35 to judge identity.

Further, the slow display instruction 42 was explained as being generated by half depression of the release button, but may also be generated by operation of another button etc.

According to the present embodiment, the device detects for any identity between at least two images consecutively captured by the image pickup sensor 14 adjacent in time based on a predetermined image characteristic quantity in accordance with a predetermined algorithm, writes images judged to not have identity in the slow display buffer 35, and does not write images judged to have identity in the slow display buffer 35, so it is possible to use the storage area corresponding to the images judged to have identity and not written in the slow display buffer 35 for storage of images judged to not have identity.

Therefore, when the subject is stationary etc., writing of a plurality of substantially identical images is prevented and the number of images substantially stored can be increased, so the efficiency of utilization of the slow display buffer 35 is improved and it is possible to reduce the frequency of best shots lost compared with the prior art which writes all images.

Figure 5:
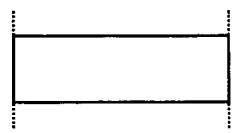
FIG. 5 is a view showing a situation for explaining the advantageous effects of an embodiment of the present invention.
Figure 6B:
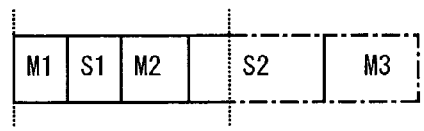
FIG. 6B is a view showing a storage capacity of a buffer of the prior art.
Figure 7A:
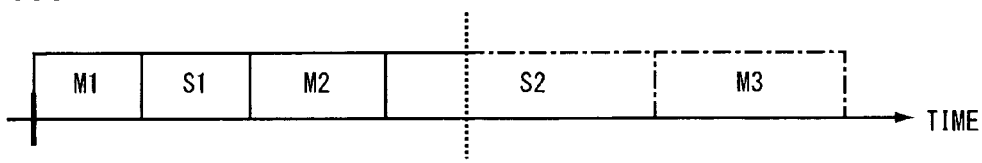
FIG. 7A is a view showing content of a slow display according to the prior art.

This will be explained in further detail with reference to FIG. 5 to FIG. 8. For example, assume the situation such as shown in FIG. 5. In FIG. 5, the abscissa shows the elapse of time. The periods M1, M2, and M3 show movement of the subject, while the periods of S1 and S2 show no movement of the subject with respect to the last captured image data of the immediately preceding period (for example, in the case of S1, the last image data in M1). Further, assume the capacity of the buffer (in the present embodiment, the slow display buffer 35) is the one schematically shown in FIG. 6A. In the prior art which stored all images regardless of whether there was movement of the subject, as shown in FIG. 6B, the images corresponding to the periods M1, S1, and M2 were successively stored in the buffer, the buffer became full in the middle of the period S2, the image of the period M3 when there was movement occurring after that could not be stored, and, in the case of slow display, as shown in FIG. 7A, the images of the periods M1, S1, and M2 were displayed and the display ended in the middle of S2. Therefore, if the best shot occurred in the period M3, this ended up being missed.

Figure 7B:
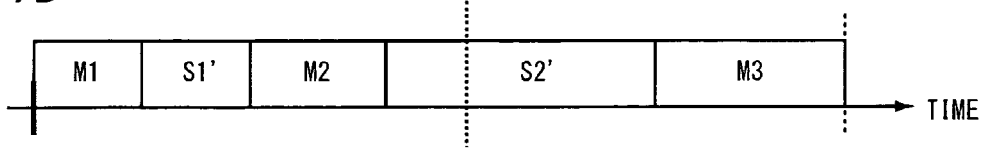
FIG. 7B is a view showing content of a slow display of an embodiment of the present invention.

As opposed to this, in the present embodiment which writes an image in the buffer when there is movement of the subject with respect to the immediately preceding captured image data and does not write it in the buffer when there is no movement of the subject, as shown in FIG. 6C, it is possible to store in the buffer the images of all of the periods M1, M2, and M3 where there is movement of the subject. In the case of slow display of this, as shown in FIG. 7B, the images are displayed for all periods of M1, S1' (last captured image data of M1), M2, S2' (last captured image data of M2), and M3. Therefore, even when the best shot occurs in the period M3, it is possible to not miss it and to capture it.

Figure 8:
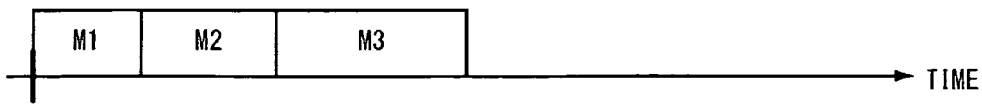
FIG. 8 is a view for explaining an advantageous effect in the case of changing part of an embodiment of the present invention.

Note that, the above-mentioned embodiment also reproduces the images of the periods S1' and S2' where there is no movement of the subject and which should not be written in the buffer at the time of slow display, that is, the last captured images of the periods M1 and M2 with movement are displayed continuously for exactly the periods corresponding to the periods S1 and S2. However, as shown in FIG. 8, it is also possible to omit the periods S1 and S2 where there is no movement of the subject and slow display only the periods M1, M2, and M3 where there is movement of the subject.

Further, in the above-mentioned embodiment, the release button is half depressed to start writing images in the buffer and start slow display substantially simultaneously with this. Therefore, while in the prior art which wrote a predetermined number of image in the buffer, then slow displayed them from the first image in the buffer, it was not possible to start the slow display until finished writing that predetermined number of images and a waiting time occurred by that extent, in the present embodiment, no such waiting time occurs and therefore it is possible to reduce the frequency of best shots missed by this as well.

Note that, the present invention can also be applied to the prior art which writes a predetermined number of images into a buffer, then slow displays them from the first image of the buffer. In this case as well, the above-mentioned advantageous effects can be obtained.

The embodiments described hereinbefore have been presented for easy understanding of the invention and are not intended to limit the invention. Accordingly, the respective elements disclosed in the foregoing embodiments shall be construed to cover all design modifications and equivalents that fall within the technical scope of the invention.

The present invention relates to matter included in Japanese Patent Application No. 2008-261491 filed on Oct. 8, 2008, the entire disclosure of which is clearly incorporated here by reference.

The invention claimed is:

1. An imaging device comprising:
an image pickup sensor that captures images of a subject consecutively at a first interval and generates plural image data,
a detection unit that detects identity or non-identity between image data adjacent in time among the plural image data generated by the image pickup sensor based on a predetermined image characteristic quantity,
a storage unit that stores image data with non-identity detected by the detection unit, and
a control unit that displays images of the image data stored in the storage unit on a display surface, wherein
the control unit displays images of the image data already stored in the storage unit on the display surface sequentially at a second interval longer than the first interval, and
the control unit displays the image of the image data stored in the storage unit simultaneously with the writing of newly-generated image data to the storage unit.

2. The imaging device of claim 1, wherein the detection unit detects the identity or non-identity based on the image characteristic quantity relating to at least one of movement of a main subject in the images of the image data adjacent in time, change of color at least at parts of the images, and change of brightness at least at parts of the images.

3. The imaging device of claim 2, wherein
the control unit transfers image data of an image instructed by a photographer to be recorded during the display of the images from the storage unit to an image storage medium.

4. The imaging device of claim 3, wherein the storage unit is a ring buffer.

5. The imaging device of claim 4, wherein the detection unit determines the identity or non-identity in accordance with a threshold value that is preset or is obtained by statistically processing past detection results.

* * * * *